United States Patent [19]
Siems

[11] 4,390,974
[45] Jun. 28, 1983

[54] SEISMIC DATA TELEMETRIC SYSTEM
[75] Inventor: Lee Siems, Houston, Tex.
[73] Assignee: Litton Resources Systems, Inc., Houston, Tex.
[21] Appl. No.: 223,519
[22] Filed: Jan. 8, 1981
[51] Int. Cl.³ .............................................. G01V 1/22
[52] U.S. Cl. ........................................ 367/76; 367/79; 455/610; 332/7.51
[58] Field of Search .............................. 367/76, 79; 455/605–607, 609–611, 617, 618; 376/4, 85

[56] References Cited
U.S. PATENT DOCUMENTS

| | | | |
|---|---|---|---|
| 4,002,896 | 1/1977 | Davies et al. | 455/610 |
| 4,072,923 | 2/1978 | Siems et al. | 367/78 |
| 4,089,584 | 5/1978 | Polcynski | 455/610 |
| 4,092,629 | 5/1978 | Siems et al. | 367/79 |
| 4,117,448 | 9/1978 | Siems | 367/79 |
| 4,144,530 | 3/1979 | Redfern | 455/612 |
| 4,234,863 | 11/1980 | Shumway et al. | 336/90 |
| 4,302,835 | 11/1981 | McMahon | 367/79 |
| 4,313,192 | 1/1982 | Nelson et al. | 367/79 |
| 4,319,186 | 3/1982 | Kingsley | 332/7.51 |

OTHER PUBLICATIONS

Culshaw et al., "Optical-Fibre Data Collection," 2/81, pp. 148–150, Electronics & Power, vol. 27, #2.
Williams, "Fiber Optics for Data Transmission," 9/76, pp. 61–66, Instrumentation Technology.
"Fiber Optics . . . Diving," 6/76, Ocean Industry, vol. 11, #6, pp. 63–64.
Gus-Bus, 9/77, 19 pages by Gus Manufacturing, Inc., Texas.

Primary Examiner—Nelson Moskowitz
Attorney, Agent, or Firm—William A. Knox

[57] ABSTRACT

A data telemetric system consists of a pair of optical fibers, each having an associated electrically conductive member. One of the fibers is a reference fiber and the other fiber constitutes a data transmission fiber. A light beam, from a source such as a laser, is launched from one end into both fibers. A signal transfer sensor is non-invasively coupled to the data fiber and applies forces to that fiber that are related to data signals thereby to modulate the light beam therein. A comparator at the other end of the pair of fibers compares variations in a characteristic of the modulated beam with corresponding characteristics of the reference beam to decipher the transmitted information. Means are provided in the signal transfer sensor for inductively sensing control and power signals transmitted through the electrically conductive member.

22 Claims, 3 Drawing Figures

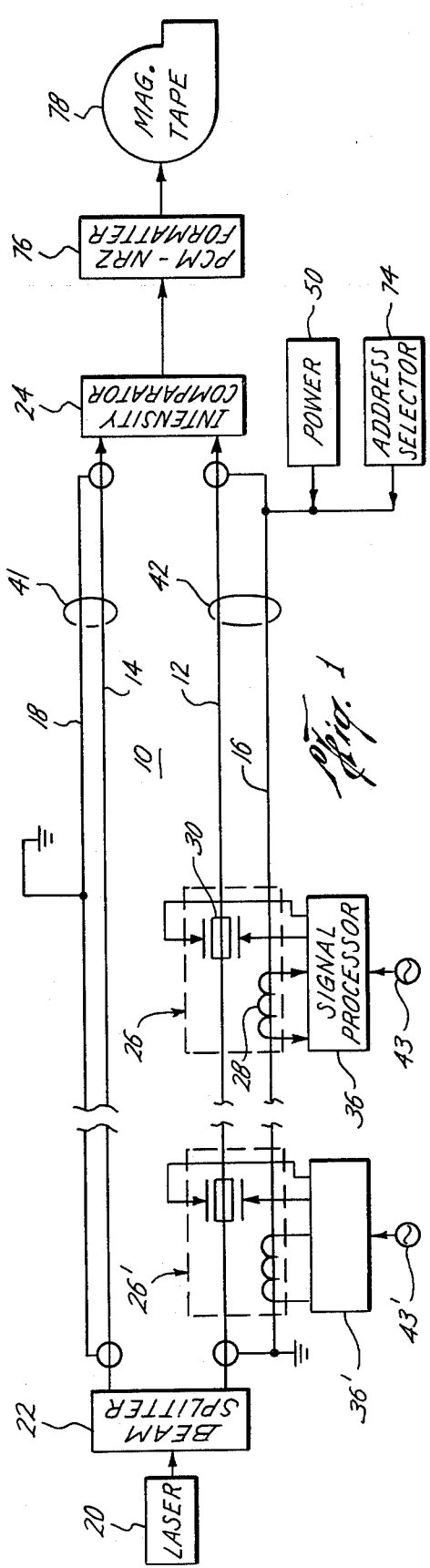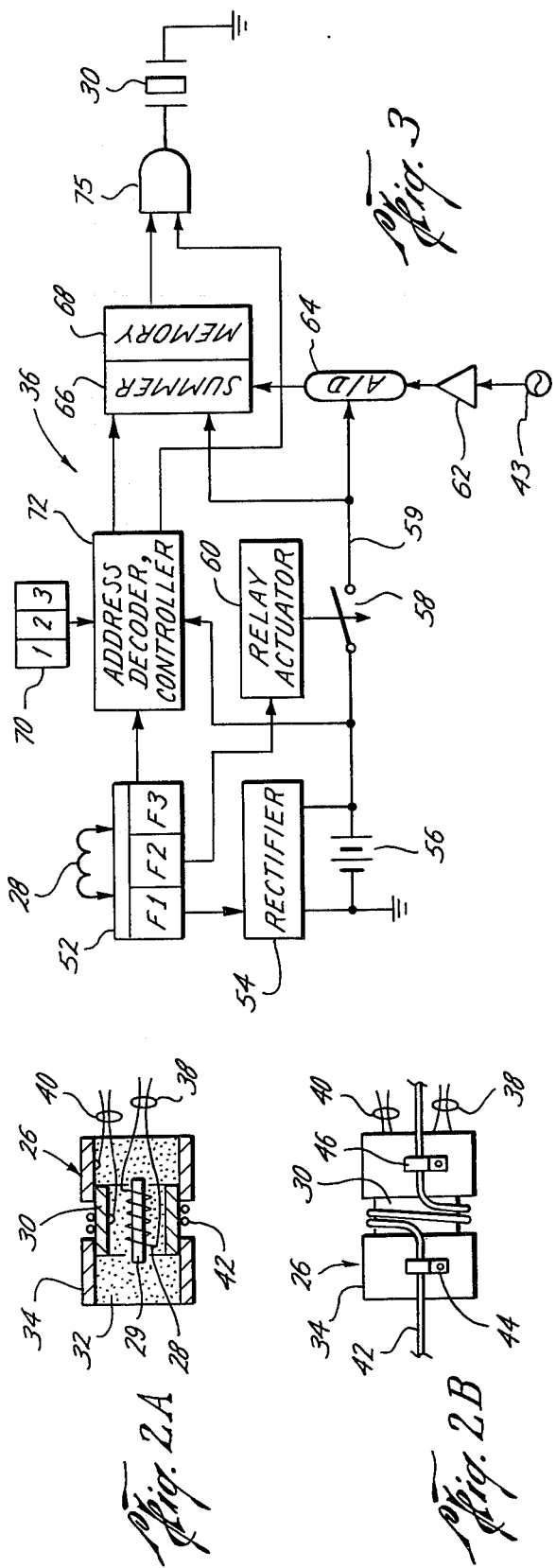

SEISMIC DATA TELEMETRIC SYSTEM

BACKGROUND OF THE INVENTION

1. Field of the Invention

This invention relates to the use of shielded optical fibers for telemetering data signals from a plurality of remote sensors to a central receiving station, with particular application to land-based seismic exploration.

2. Discussion of the Prior Art

In land-based seismic exploration a plurality of geophones or geophone groups are laid along a line of survey. Each geophone or geophone group represents a single data channel. There may be several hundred such channels. Customarily, each group is connected to a central recording unit by means of a dedicated pair of wires. The wires are combined into a single multiconductor cable which may be several miles long. As the number of data channels is increased, so also is the size of the cable increased. The ultimate channel capacity of the cable is limited in part by the ability of the seismic crew to physically man-handle the cable when it is to be deployed.

Recently, telemetric systems have come into fashion within the geophysical industry. In known telemetric systems, data are transmitted through data links consisting of a single pair of conductors according to a time-division-multiplex regimen. In a typical system, two or three separate data-input channels are coupled to each of a plurality of data acquisition modules. The analog input data are filtered, amplified, digitized and temporarily stored in the data acquisition units. Upon command from the central recording unit, the digital data words are strobed out to the central recording unit over the telemetric data link. Digital data words from the respective data acquisition units are time-multiplexed. Many of the known systems require a few additional conductors for houskeeping functions such as interrogation, command, power and testing. In some systems, acquired data are summed before transmission.

All of the known telemetric systems have one feature in common: To make a signal connection between a data acquisition unit and the data telemetric system, it is necessary to physically violate the integrity of the data link. That is, the protective insulation must be removed or penetrated to make an electrical connection. In some very long telemetric systems, the data link is cut into a plurality of shorter sections, each of which is terminated by a connector plug.

Wherever physical electrical connections must be made, there is always the chance of broken leads, poor contacts due to moisture or corrosion. The further disadvantage of most known systems is that the location of a data acquisition unit is perforce dictated by the location of the connecting plugs or other cable entry points.

SUMMARY OF THE INVENTION

It is an object of this invention to provide a means for non-invasively coupling a plurality of data acquisition units or data processors to a telemetric link without physically violating the integrity thereof.

It is a further object of this invention to provide a telemetric system in which a plurality of data processors may be connected to the telemetric link to any desired location therealong.

In a preferred embodiment of this invention, a pair of separate elongated optical fibers are provided. The optical fibers each may include an associated electrically-conductive member. A source of monochromatic light launches a light beam into both optical fibers from one end thereof. Electric power and control signals are transmitted through the electrically conductive member of a first selected one of the optical fibers. A plurality of data signal processors are distributed at intervals along the length of the optical fibers. At least one signal transducer such as a geophone is connected to each processor. A signal transfer sensor is interconnected with each data signal processor and is non-invasively coupled to the first optical fiber. The signal transfer sensor inductively detects the control signals transmitted through the associated conductive member of the first optical fiber. Upon receipt of a control signal, the processors send data to the signal transfer sensor for application the first optical fiber.

In accordance with an aspect of this invention the signal transfer sensor applies a force, related to the data signal, to the first optical fiber to modulate a characteristic of the light beam transmitted through that fiber. Characteristics of the modulated light beam are compared with corresponding characteristics of the light beam transmitted by a second reference fiber in parallel with the first modulated fiber to decipher the intelligence transmitted through the first fiber and to eliminate noise created by stress applied in common to the fibers due to trucks, animals etc.

In accordance with another aspect of this invention, AC power at one of two frequencies is transmitted through the electrically conductive element associated with the first optical fiber. AC power at a first frequency is inductively detected by the signal transfer sensor and is used to charge a DC power source in the data signal processors. AC power at a second frequency is inductively sensed by the signal transfer sensors as a control signal to initiate a recording cycle in the data processors.

In accordance with a further aspect of this invention, pulse coded control signals are inductively sensed by the signal transfer sensors as an address code to command a selected data signal processor to send recorded data signals to the signal transfer sensor for application to the first optical fiber.

In accordance with yet another aspect of this invention, a signal transfer sensor consists of a hollow cylindrical piezo-electric element having an inductive element mounted concentrically inside. The sensor is provided with means for receiving therearound, a wrap of the first optical fiber. Electrical connections are provided for interconnecting the two elements of the sensor with an associated data signal processor.

BRIEF DESCRIPTION OF THE DRAWINGS

The benefits and features of this invention will be best understood by reference to the accompanying description and the drawings wherein:

FIG. 1 is an overall view of the telemetric system;

FIG. 2a is a cross sectional view of a signal transfer sensor;

FIG. 2b is an external side view of the sensor of FIG. 2a; and

FIG. 3 is a schematic diagram of the principal components contained within a data signal processor.

DETAILED DESCRIPTION OF THE PREFERRED EMBODIMENT

Referring now to FIG. 1, the telemetric system 10 of this invention consists broadly, of a pair of individual, separate optical fibers 12 and 14, each of which includes an integrally associated electrically conductive member 16 and 18, such as a conductive stress member, which may be parallel to or tubular and coaxial with the optical fibers. The optical fiber and its associated electrically conductive stress member are, of course, enclosed within a protective outer sheath.

Optical fibers may be classified according to propagation mode as single mode or multimode.

A single-mode fiber has a radius comparable to the wave-length of the transmitted light beam. Usually the radius is 1.5 to 8 microns. Because of the small diameter, the light beam suffers virtually no internal reflection and it propagates through the fiber as a single beam. A variation in optical path lengths between two fibers can be determined by measuring the relative variation in angular phase shift between the transmitted light beams.

The radius of a multimode fiber is on the order of 20 to 150 microns. A light beam transmitted through such a fiber is, due to multiple internal reflections, broken into a plurality of individual beams of different lengths. Given a pair of multimode fibers, into each of which a light beam is launched, a relative variation in length between the two is measurable by comparison of the relative variation in intensities of the transmitted beam. Because the beam necessarily propagates over many paths through a multimode fiber, phase difference cannot be measured.

A source of monochromatic light such as a laser 20 at one end of the optical fibers launches a light beam through the two optical fibers by means of a beam splitter 22 of any desired type. A comparator 24 at the other end of the optical fibers compares selected relative characteristics of the light beams transmitted through the two optical fibers. The light beam characteristics may be optical phase shift or light intensity difference. In a preferred implementation of this invention, multimode fibers are used. Accordingly differences in light intensity are compared.

Before proceeding further, let us investigate the known art. It is well known that application of a compressive force or a tensile stress will modulate the intensity or the phase angle of a light beam transmitted through an optical fiber. See for example "An Optical Fibre <sic> Data Collection Highway" by Davies and Kingsley presented at Electro-Optics/Laser International, 76 UK. Thus, if an optical fiber is wrapped around a piezo-electric element and the element is driven by a signal that contains information. The optical fiber will be stressed in proportion to the signal amplitude and the light beam transmitted by the optical fiber will be modulated accordingly. By comparing the modulated light beam with an ummodulated light beam transmitted by a reference fiber, the transmitted information can be extracted. If a single-mode fiber is used, the transmitted light beam may be phase-modulated. An interferometer may be used to compare the two light beams. In multimode fibers, the preferred type of fiber for this disclosure, the light beam is intensity modulated. In broad terms, FIG. 1 shows the essentials of an optical fiber data handling system.

Optical fibers, being inherently somewhat delicate, require external protection and are contained within a jacket or sheath to guard against abrasion. A stress member may be included within the sheath, integral with the fiber. The stress member may be metallic or it may be of plastic provided only that it be conductive. The conductive member may be tubular and surround the fibers or it may be in the form of a strand parallel to the fiber and contained within the jacket.

Returning now to FIG. 1, one of the fibers such as 12 and its integral conductive member 16 serves as a data line. A source of AC power and an address encoder for transmitting encoded control signals are coupled to conductive member 16 as will be described in more detail later. The other fiber such as 14 and 18 is a reference line and is physically separate from fiber 12 and member 16.

Signal transfer sensors or data transceivers such as 26 and 26' are provided. The sensors 26 and 26' include an inductive element 28 and a force generating element 30, such as a hollow piezo-electric element as shown in FIG. 2a. In the preferred embodiment of FIG. 2a, an inductive element 28 of any desired type having a magnetic core 29 is mounted inside hollow, cylindrical piezo-electric element 30 and is held in place by potting compound 32. A suitable protective enclosure 34 may be provided. The two elements are interconnected with a signal processor such as 36 and 36' by leads 38 and 40 respectively. Processor 36 receives and processes signals from a seismic transducer 43, such as a geophone as will be described later. Two sensors and data processors are shown but in practice a plurality of such devices will be employed.

Referring to FIG. 2b, in use, one or two wraps of optical cable 42, consisting of optical fiber 12, conductive member 16, and a protective outer sheath is wound around signal transfer sensor 26. Optical cable 42 is held in place by spring clips 44 and 46. In that arrangement, signals applied to piezo-electric element 30 apply a proportionate tensile stress to the optical fiber 12 in optical cable 42 thereby lengthening the light path therethrough. In a multimode fiber, a change in length modulates the intensity of the light received by comparator 24.

Electrical control signals present in electrically conductive member 16 are inductively sensed by inductive element 28. Assuming that inductive element 28 consists of a coil of ten turns of wire and assuming that one turn of cable 42 is wrapped around signal transfer sensor 26, the assembly constitutes a 1:10 step-up transformer.

In view of the above discussion, it is clear that signal transfer sensor 26 is non-invasively coupled to optical cable 42. That is to say the integrity of optical cable 42 is not violated; the outer protective sheathing is not penetrated.

Referring now to FIGS. 1 and 3, there is shown the essential components of a data acquisition unit or data procesor 36. A source 50 of AC power is provided and is coupled to electrically conductive member 16 of one of the optical fibers 12 that serves as a data line. AC power source 50 provides continuous power at either of two frequencies, such as 3.0 kHz and 2.5 kHz at the option of an operator of the system. Inductive coil 28 inductively senses the power signal and transmits the received signal to a filter box 52. Filter box 52 consists of three band-pass filters. A first filter F1 passes a 3.0 kHz signal to rectifier 54 which converts the AC signal to DC to charge rechargeable battery 56 that powers the data processing electronics.

A normally open relay 58 is provided. So long as relay 58 is open, the data-processing electronics are dormant. Upon command by the system operator, the output frequency of power source 50 is changed from 3.0 kHz to 2.5 kHz. A second band pass filter F2 in filter box 52 receives and directs the 2.5 kHz signal to relay actuator 60. Upon receipt of the 2.5 kHz signal, relay 58 closes and applies power to the data-processing electronics through power line 59 to initiate a recording cycle. Relay 58 remains closed for the duration of data recording and processing cycle at the end of which the frequency of the power signal is changed back to 3.0 kHz.

A recording cycle is a period of time, usually six to thirty seconds during which seismic data signals from seismic transducer 43 are received and processed. The processing steps include signal sampling at 1 to 4 millisecond intervals, filtering and amplification of the signals by an amplifier 62 and signal digitization by analog to digital converter 64. A summing device 66 may be provided to receive and sum digitized signals from two or more successive recording cycles. The summed data signals are then temporarily stored in a memory 68 to await a data-transmit command. All of the enumerated data-processing steps are conventional and well known and per se form the part of this invention. It is to be understood that all of the data signal processors such as 36 and 36' respond to the 2.5 kHz recording-cycle intiation signal at the same time.

Upon completion of a desired number of recording cycles with the processors in a listening mode the signal processors may be interrogated in turn by a pulse-coded control signal. Each signal processor is assigned a unique address. The address is supplied by a manually-actuable encoder 70 such as a BCD thumbwheel switch of any well-known type. Encoder 70 supplies the unique address to address decoder and controller 72. It is to be observed that address decoder 72 is connected to DC power source 56 and is "alive" when signal processor 36 is in the listening mode although the remainder of the electronics is dormant.

An address selector 74 is coupled to electrically conductive member 16. Address selector 74 transmits the unique adress of a desired signal processor from which stored data signals are to be recovered. The address is transmitted as a pulse encoded control signal at a frequency such as 5.0 kHz. Any desired type of code such as Manchester, may be employed. Inductive coil 28 senses the control signal and presents it to filter box 52. Filter F3 accepts the control signal and sends it to the address decoder and controller 72. If the address code of the control signal matches the unique address provided by address encoder 70, address decoder sends an enable signal to AND gate 75. The data signals stored in memory 68 are then strobed out to piezo-electric element 30 which applies pulse-coded signals to optical fiber 12 as described earlier. The applied signals stress optical fiber 12 in a manner related to data-signal amplitude, thereby modulating the intensity of the light beam that is transmitted through the fiber. In like manner, each of the remaining data signal processors are interrogated in turn by suitably coded control signals.

A light intensity comparator 24 at the end of the optical fibers opposite to laser 20, receives the light beams from optical fibers 12 and 14. Comparator 24 compares the relative light intensity between the two beams to recover the pulse-coded data signals. A formatter 76 converts the pulse coded signals to any desired format suitable for recording on an archival storage device such as a magnetic tape 78.

In use, the components at the right hand end of FIG. 1 such as power source 50, address selector 74, comparator 24, etc. are generally mounted in a central station such as a truck. Optical fibers 12 and 14 with their integral electrically conductive elements 16 and 18 are laid out from the central station along a line of survey. The fibers may be several kilometers long. Laser 20 and beam splitter 22 are then connected to the other end of the fibers. Alternatively, the left hand end of optical fibers 12 and 14 may be looped around back to the central station. A plurality of signal processors such as 36 and 36' with their attached data signal transfer sensor such as 26 and 26' are distributed at desired intervals along the optical fibers. A unique address code is assigned to each data processor by encoder 70. Optical fiber 12 and its integral electrically-conductive member 16 comprising optical cable 42 is wrapped once or twice around each signal transfer sensor.

Optical cable 42 is of course, physically separate from the reference optical cable 41 although in use, both cables are laid out on the ground substantially parallel to one another or at least relatively close together. By that arrangement, random stresses due to vehicular or pedestrian traffic are applied equally to both cables. Thus, when the two transmitted light beams are compared, the relative differences in light intensity will truly represent signals; random noise cancels out.

AC power is applied at 3.0 kHz to charge the batteries in the data signal processors and to hold the system in the listening mode. The frequency of the AC power supply is next changed to 2.5 kHz to place the entire system in the recording mode and a recording cycle is initiated in the data signal processors.

The recording cycle may be repeated several times at the same location. The data signals from the several recording cycles are summed and stored. Between a pair of successive recording cycles, the frequency of the applied AC power is changed of course from 2.5 kHz back to 3.0 kHz.

By means of address encoder 74, each data signal processor is addressed in succession by means of a pulse-coded control signal. As each data signal processor recognizes its unique address, it applies the data signals stored therein to optical fiber 12, in the form of tensile forces related to the amplitudes of the data signals.

In the foregoing description, the force-applying member of the signal transfer sensor applies a tensile stress to optical cable 42. Application of tensile stress lengthens the optical fiber 12 thereby modulating the intensity of the transmitted light beam in proportion to the applied signal.

In an alternate embodiment the signal transfer sensor may be so configured as to apply a compressive rather than a tensile stress to the optical fiber. The applied compressive force will modulate the transmitted light beam similarly.

Many other variations in the physical arrangement of the signal transfer sensor, the means for demodulating the information carried by the transmitted light beam and means for controlling operation of the signal processor, without departing from the scope and spirit of my invention.

I claim as my invention:
1. A signal transfer sensor for use with an optical fiber data handling system, comprising:

means for non-invasively coupling said sensor to said optical fiber data handling system at any desired location;
means associated with said sensor for inductively receiving power from said optical fiber data handling system;
means for accepting a signal from the optical fiber data handling system for use by the sensor;
means for sensing a data signal; and
means for applying to the optical fiber data handling system, a signal related to the sensed data signal.

2. The signal transfer sensor as defined in claim 1 comprising:
means for inductively accepting a pulse-coded control signal from said optical fiber data handling system.

3. The signal transfer sensor as defined in claim 1 wherein said sensor further comprises:
means for applying to said optical fiber data handling system a force that is related to a sensed data signal.

4. The signal transfer sensor as defined in claim 3 wherein said applied force is compressive.

5. The signal transfer sensor as defined in claim 3 wherein said applied force is a tensional stress.

6. The signal transfer sensor as defined in claim 4, comprising:
means for applying to said optical fiber data handling system a signal related to said sensed data signal in response to said inductively accepted signal.

7. The signal transfer sensor as defined in claim 1 further comprising:
means, coupled to said sensor, for receiving and processing data signals from a transducer and for applying said processed data signals to said sensor for application to said optical fiber data handling system.

8. The signal transfer sensor as defined in claim 7, comprising:
means for providing DC power to said receiving and processing means.

9. The signal transfer sensor as defined in claim 8 comprising:
means for receiving power from said optical fiber data handling system at a first frequency to recharge said DC power source; and
means for receiving power at a second frequency to enable operation, at desired intervals, of the data-signal receiving and processing means.

10. The signal transfer sensor as defined in claim 3 wherein said sensor comprises:
a piezo-electric force applying means; and
an inductive sensor integrally incorporated with the force-applying means.

11. A data telemetric system including a pair of elongated optical fibers, each associated with an electrically-conductive member, comprising:
means for transmitting control signals through the electrically conductive member of one of said optical fibers;
a data processor for sensing and processing data signals;
a data transceiver means, including a piezo-electric force-applying means integrally combined with an inductive control-signal sensing means associated with said data processor, for receiving said control signals and in response thereto, for applying to said one optical fiber, forces related to said sensed and processed data signals; and
means for non-invasively coupling said data transceiver to said one optical fiber at any desired location.

12. The data telemetric system as defined in claim 11, comprising:
means for launching a light beam into both said optical fibers from one end thereof;
means at the other end of said optical fibers for receiving and comparing selected characteristics of the light beams transmitted through both said optical fibers.

13. The data telemetric system as defined in claim 11 wherein a selected characteristic of the light beam transmitted through said one optical fiber is modulated in response to the force applied by said data transceiver means.

14. The data telemetric system as defined in claim 11 wherein the data transceiver further comprises:
a cylindrical piezo-electric element having a pair of input terminals for receiving data signals from said data processor;
an inductor coil mounted interiorly of said piezo-electric element having a pair of output terminals for sensing control signals and for dispatching control signals to said data processor; and
means for receiving a wrap of said one optical fiber around said data transceiver.

15. The data telemetric system as defined in claim 11 comprising:
a rechargeable DC power source associated with said data processor;
an AC power source coupled to the conductive member of said one optical fiber for transmitting power at first and second frequencies;
means in said data processor, coupled to the data transceiver, for receiving power at a first frequency to recharge said DC power source; and
means in said data processor responsive to a second frequency received by said data transceiver for initiating a data-recording cycle.

16. The data telemetric system as defined in claim 15, comprising:
means in said data processor, responsive to a pulse-coded control signal sensed by said data transceiver, for transferring recorded data signals to said data transceiver for application to said one optical fiber.

17. A seismic data telemetric system having:
a pair of elongated optical fibers each having an associated electrically-conductive member incorporated therewith, comprising:
means at one end of the pair of fibers for transmitting a monochromatic light beam therethrough;
means for transmitting power and control signals through the electrically conductive member of one of said fibers;
a plurality of data signal processors, distributed at intervals along the optical fibers for receiving and processing seismic signals from at least one transducer;
a plurality of data transceivers, non-invasively coupled to said one fiber and interconnected with the respective signal processors for inductively receiving control signals and in response thereto for applying to said one optical fiber, a force that is related to processed seismic signals, to modulate a characteristic of the transmitted light beam.

18. The seismic data telemetric system as defined in claim 17 comprising:
   means, at the other end of said optical fibers, for receiving the light beam transmitted through both optical fibers; and means for comparing a characteristic of the modulated light beam received from said one optical fiber with a corresponding characteristic of the light beam received from the other optical fiber.

19. The seismic data telemetric system as defined in claim 18 wherein the data transceiver comprises:
   a cylindrical piezo-electric element having a pair of input terminals for receiving signals from said data signal processor; and
   an inductive element for sensing control signals having a pair of output terminals for sending the sensed control signals to said data signal processors.

20. The seismic data telemetric system as defined in claim 19 comprising:
   means on said transceiver unit for receiving a wrap therearound of said one optical fiber.

21. The seismic data telemetric system as defined in claim 20, comprising:
   an AC power source coupled to the electrically conductive member of said one optical fiber for transmitting power at first and second frequencies;
   a rechargeable DC power source associated with the respective data signal processors;
   means in said data signal processors for receiving power from the respective data signal transceivers at a first frequency to recharge the DC power source; and
   means in said data signal processors for receiving at desired intervals, power from said transceivers at a second frequency to initiate a recording cycle in said processors.

22. The seismic data telemetric system as defined in claim 21 comprising:
   means for injecting into the electrically conductive member, at desired intervals, a control signal consisting of a selected address code;
   means for assigning a unique address code to each data signal processor;
   means, in the respective data signal processors, for decoding address codes sensed by the associated data signal transceiver; and
   means in a data signal processor for transferring recorded data signals to the data signal transceiver for application to said one optical fiber when the decoding means recognizes its unique address code.

* * * * *